Figure 1:
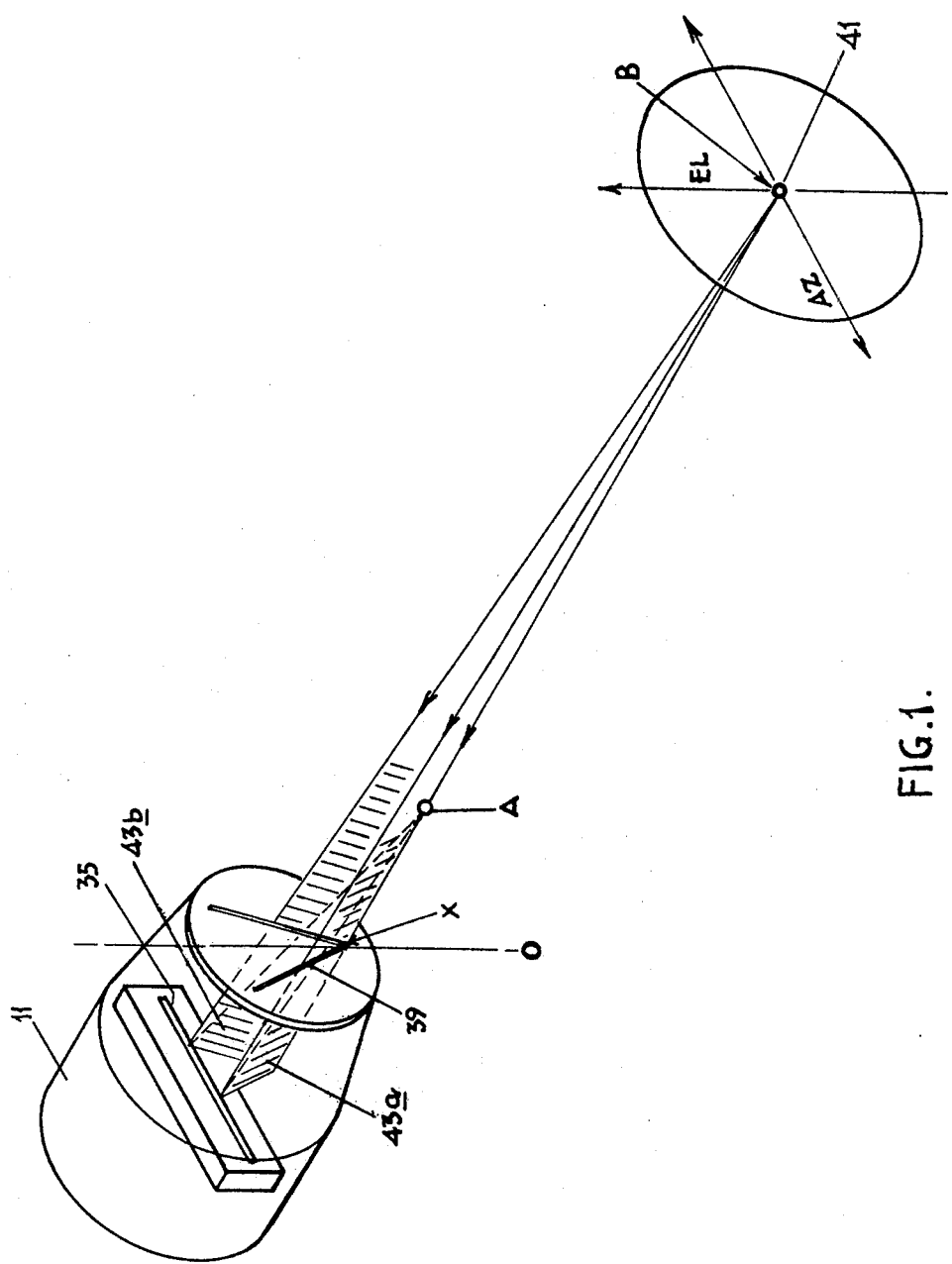

United States Patent [19]
Ellis

[11] 4,092,072
[45] May 30, 1978

[54] OPTICAL SENSORS

[75] Inventor: Stafford Malcolm Ellis, Maidstone, England

[73] Assignee: Elliott Brothers (London) Limited, Chelmsford, England

[21] Appl. No.: 710,619

[22] Filed: Aug. 2, 1976

[30] Foreign Application Priority Data

Aug. 28, 1975 United Kingdom ............... 35518/75

[51] Int. Cl.² ............................................. G01B 11/26
[52] U.S. Cl. ................. 356/152; 250/203 R; 356/141; 356/172
[58] Field of Search ................... 356/1, 141, 152, 172; 250/203.2

[56] References Cited

U.S. PATENT DOCUMENTS

| 3,147,384 | 9/1964 | Fenton et al. | 356/141 |
| 3,717,413 | 2/1973 | Kubo et al. | 356/152 |
| 3,827,807 | 8/1974 | Fletcher et al. | 356/141 |
| 3,951,550 | 4/1976 | Slik | 356/152 |
| 3,989,384 | 11/1976 | Friedman | 356/152 |

FOREIGN PATENT DOCUMENTS 1,410,322  10/1975  United Kingdom ................ 356/141

Primary Examiner—S. C. Buczinski
Attorney, Agent, or Firm—Kirschstein, Kirschstein, Ottinger, Frank & Cobrin

[57] ABSTRACT

An angular position sensor having a housing with an aperture in the form of two mutually inclined slits. Behind the aperture is a linear array of light sensitive elements which intercepts laminar light beams developed by the slits from light from a small light source. The positions of interception of the light on the array constitute a measure of the angular position of the light source in elevation and azimuth.

7 Claims, 3 Drawing Figures

OPTICAL SENSORS

This invention relates to angular position sensors for producing outputs which are a measure of the angular position in two axes of a small light source. The term 'small' as applied to the light source is used hereinafter to mean that the source may be regarded as a point source in relation to the sensor.

According to the present invention there is provided an angular position sensor comprising a linear array of light sensitive elements and a light obstructing member, wherein said light obstructing member has mutually inclined edges so orientated that, in use, a corresponding two boundary regions in the shadow of said light obstructing member are produced on said linear array as a result of partial obstruction of light from a small light source by said light obstructing member, the positions of said boundary regions constituting a measure of the angular position of the light source to the sensor in two orthogonal axes.

Also according to the present invention there is provided an angular position sensor having a housing formed with an aperture, which aperture is in the form of two mutually inclined slits, the housing containing a linear array of light sensitive elements which is spaced from said slits and so orientated that, in use, laminar light beams developed by the slits from a small light source impinge on the array, the positions at which the two laminar beams impinge on the array constituting a measure of the angular position of the light source in two orthogonal axes.

In such an angular position sensor preferably said mutually inclined slits are rectilinear, lie in a common plane, and are intersected at substantially equal angles in the plane of the slits by a plane or planes containing said linear array.

Preferably said mutually inclined slits are in a V-shaped configuration.

Figure 2:
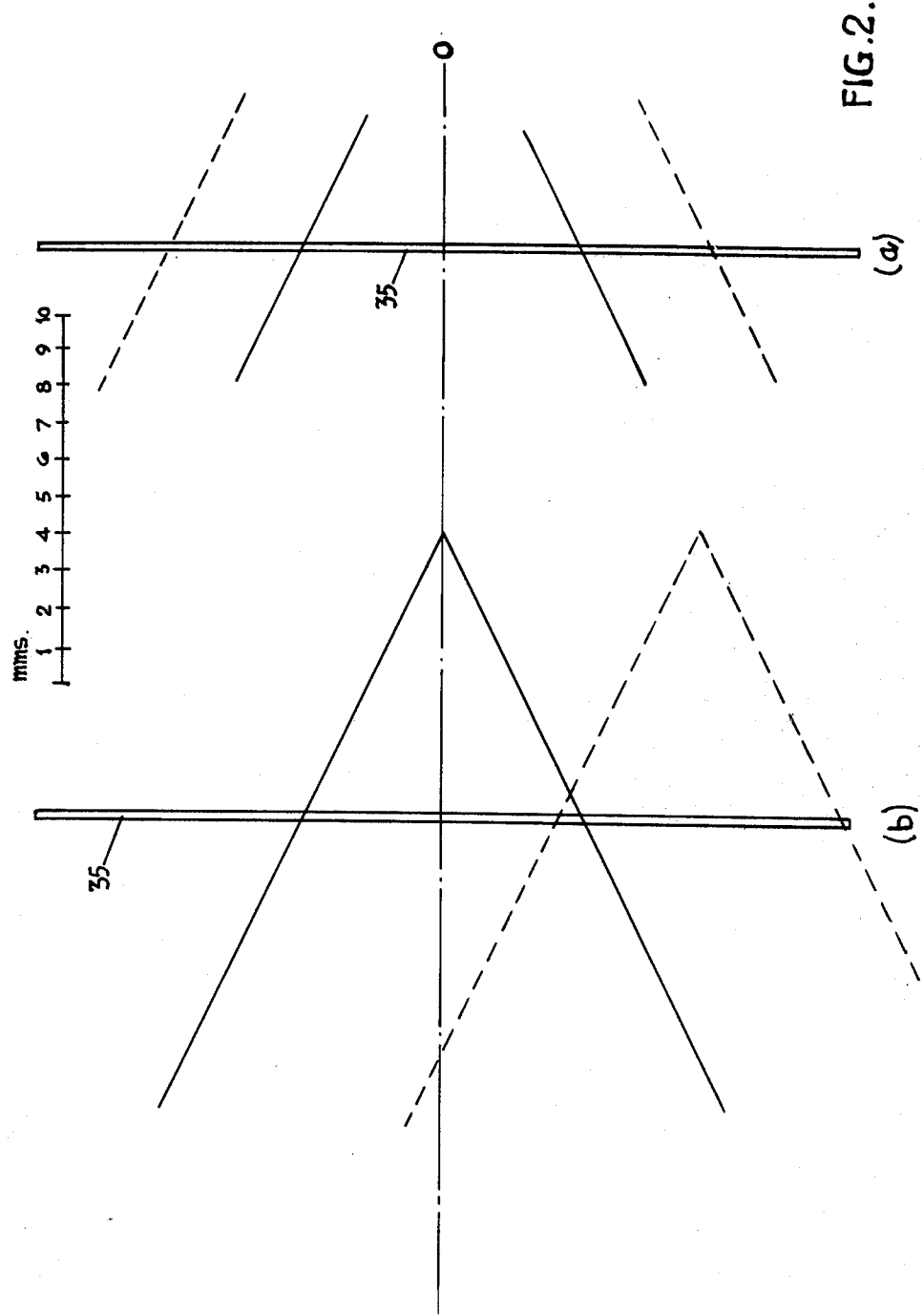
Figure 3:
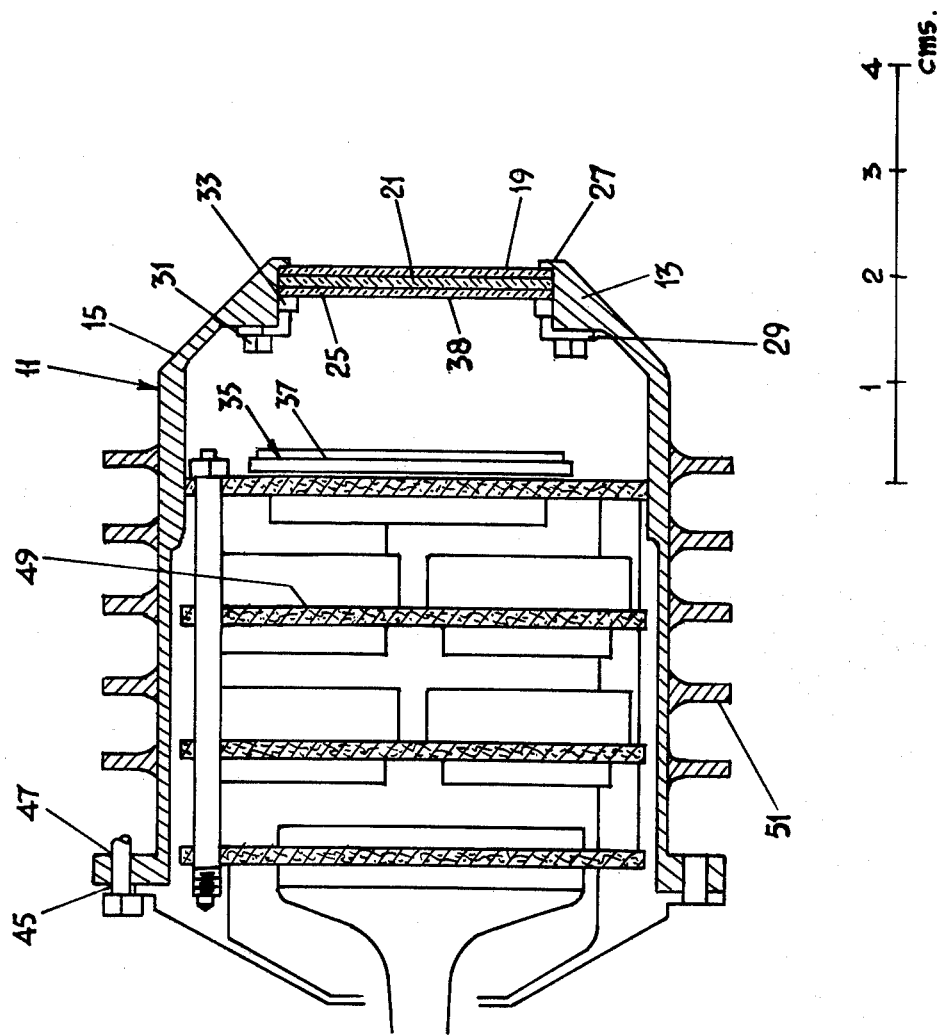

An embodiment of the invention is hereinafter described with reference to the accompanying drawings in which:

FIG. 1 contains a pictorial representation of a sensor and a construction for demonstrating its principle of operation;

FIG. 2 is a geometrical diagram drawn to a scale shown in the figure showing the optimum angle between the two rectilinear slits of the sensor; and FIG. 3 is a diagram drawn to a scale shown in the figure showing a longitudinal axial section through a sensor according to the invention.

Referring to FIGS. 1 and 3, the sensor has a housing 11 at the conical forward end 15 of which is a circular flange 13 which locates an assemblage of circular plates 19, 21 and 25.

As shown in FIG. 3 the outermost plate 19 which is a glass protective cover plate, abuts the rim portion 27 of the flange 13; nuts as 29 are threadingly connected to studs as 31 which project from the flange 13. The nuts 29 contact a ring 33 which bears against the innermost plate 25 so that the assemblage of circular plates is firmly supported.

Within the housing 11 there is a linear array 35 of substantially contiguous light-sensitive elements 37. In the present embodiment the array is an array of light-sensitive charge-coupled devices. The array 35 comprises 1728 charge-coupled elements occupying a length as specified in FIG. 3, and extending horizontally behind the vertical assemblage of circular plates. Clearly the array may have a different length, more or fewer elements, depending on the application for the sensor and, of course, on the availability of arrays charge-coupled devices containing the desired number of elements within the required length.

Considering the assemblage of plates 19, 21 and 25 in greater detail the innermost plate 25 has on its inner surface 38 i.e. the surface facing the array 35 of light-sensitive charge-coupled devices, a coating which is opaque save for a V-shaped aperture 39. In practice the opaque coating and its V-shaped aperture 39 are produced by a conventional photographic image forming process.

The plate 21 is a filter element transmissive to radiation in the near infra-red portion of the spectrum, the transmission characteristic of the filter being chosen so as to match the response characteristic of the light-sensitive charge-coupled elements of the array 35.

The sensor is secured to a part constituting a reference frame for a 'point' light source such for example as a light sensitive diode (LED) 41.

Although the source 41 is omnidirectional, the plate 25 transmits only that portion of the light which is received at the V-shaped aperture 39. The two mutually inclined laminar beams 43a 43b emergent from the limbs of the V-shaped aperture 39 fall on the linear array 35.

Initial adjustment of the sensor with respect to the part on which it is mounted may be achieved by means of nut and bolt connectors 45 which engage the housing 11 at circumferentially extending slots 47 in a flange of the housing.

The housing may in addition to the array of light-sensitive charge-coupled devices 35 also contain electrical signal processing circuitry 49 which receives outputs from the charge coupled devices of the array 35. As indicated, the housing 11 may have cooling fins 51 which surround its main body and are positioned in the vicinity of the electrical circuitry 49.

Angular movement of the point light source 41 in elevation causes the inclined laminar beams 43a 43b to intercept the array 35 at positions which approach or retreat from one another depending on the sense of angular elevational movement and to an extent determined by the amplitude of such angular movement. On the other hand angular movement of the light source 41 in azimuth causes the inclined laminar beams 43a 43b to move in unison in one direction or the other along the array 35 depending on the sense of azimuthal movement of the light source and the amplitude of such movement.

Clearly the sensor may be used not merely to provide output indicative of the change in angle of the light source in two axes but also to provide a measure of the angular position of the light source with respect to the co-ordinate reference frame. To enable this to be done it is, of course, necessary to calibrate the sensor initially so that it bears a known relationship to the co-ordinate reference frame. Provided that the changes in angular position of the light source can be referred to a sensor the angular position of the source with respect to the co-ordinate reference frame is ascertainable.

In practice for reasons of commercial availability the linear array of charge-coupled devices is a rectilinear array. The rectilinear array extends in a horizontal plane with respect to the vertical plane of the V-shaped aperture, and is symmetrically disposed with respect to the aperture such that planes in which it extends intersect the mutually inclined slits at equal angles. The array is however, preferably a linear array in the form of an arc of a circle having a centre of curvature at the intersection of the two limbs of the V-shaped aperture (the point X in FIG. 1). With such a circular array equiangular changes in azimuth or elevation of the position of the source, as measured from the point X, produce respective equal changes in the position of interception of the array by the laminar beams, and hence a constant sensitivity for angular movement in each orthogonal axis may be obtained. With a rectilinear array however, equiangular incremental changes in the position of the source produce in either axis non-linear changes in the position of interception of the array by the laminar beams. This non-linear relationship is nevertheless a simple one and may easily be allowed for in the processing circuitry associated with the device, and the practical constructional advantages of rectilinear arrays thereby accrued.

The use of a rectilinear array also results in a variation in the spread of the laminar beams at the point where they are intercepted by the array. Such a variation has the effect that more or fewer charge-coupled elements are covered by the beams upon interception by the array for different angular positions. As with the above-mentioned non-linear variation of the point of interception with angular position, the variation in the spread of the beams can be corrected by using a circularly curved linear array, but again rectilinear arrays may be used and the spread of the beams allowed for in the processing circuitry.

The sensor may be constructed to provide equal sensitivity for angular movements in both orthogonal axes by providing that the two limbs of the V-shaped aperture are mutually inclined at an angle of 53°. Equal sensitivity for any incremental angular change however necessitates a circularly curved array, but with a rectilinear array equal variation in sensitivity with angle in both axes is obtained. Thus with the limbs so inclined no additional computation or scaling is necessary to correlate the angular movement in one axis to that of the other, although with a rectilinear array the processing circuitry is still necessary to allow for the variation in response with angular position.

The operation of a sensor having its limbs inclined at 53° and using a rectilinear array is shown schematically in FIG. 2. FIG. 2a shows the effect of a 22½° angular movement in elevation of the source from the datum point X, through which point the vertical line O is drawn. FIG. 2b similarly shows the effect of a 22½° angular movement in azimuth from the datum position. The unbroken lines are the lines along which the laminar beams intercept the vertical plane of which the light-sensitive surface of the array forms a part, for zero azimuthal and elevational angles, and the broken lines show similarly the lines of interception when the source has moved through 22½° in the respective orthogonal plane.

It is an essential requirement of the sensor that outputs derived from the linear array of change-coupled elements should convey angular information which is independent of translational movements of the source with respect to the datum position X. That this is satisfied may be gathered from a consideration of the effect of the positioning of the source 41 at the position A as shown (FIG. 1). The position A is along the line joining the position B of the source 41 and the datum point X, and thus the two points A and B have the same angular co-ordinates in both azimuth and elevation. It will be seen from FIG. 1 that the positions at which the resultant laminar beams 43a and 43b intercept the array are the same for light originating from either point A or point B and indeed any point along the line XAB. With a rectilinear array the spread of the beams at their interception of the array will, as previously mentioned, vary to a degree; but such a spread is a second order effect and, as previously stated, it can be allowed for in the processing circuitry and the prime data, i.e. the identity of the central plane of interception, can be distinguished.

In the above described embodiment of the invention light from the source is transmitted to the light-sensitive array through mutually inclined slits. It will be appreciated however, that other types of apertures may alternatively be used, for example a triangular aperture, so long as the aperture provides mutually inclined edges, and thereby produces regions of illumination and shadow on the light-sensitive array such that the boundaries of which regions move in the aforementioned manner in response to angular movement of the light source.

It will be appreciated furthermore that instead of an aperture being formed in an opaque face surface of the sensor, an opaque member having mutually inclined edges may be positioned in front of the linear array, the surrounding face surface then being transmissive to light. Such an arrangement may be a negative version of the above described embodiment and include a V-shaped light obstructing member instead of the V-shaped aperture. The light-sensitive elements are then adapted to produce an output indicative of the angular position of the light source in response to the positions of the shadows of the limbs of the V-shaped member which fall on the array.

I claim:

1. A sensor for use in apparatus for determining angular position, the sensor comprising a linear array of discrete light sensitive elements producing discrete outputs and a light obstructing member having two mutually inclined edges, said light obstructing member being positioned with respect to said linear array of light sensitive elements so as to produce a shadow on said linear array as a result of partial obstruction of light from a small light source, said shadow simultaneously having two boundary regions, corresponing to the two mutually inclined edges of said light obstructing member, whose positions depend on the angular position of the light source with respect to the sensor in two orthogonal axes.

2. A sensor for use in apparatus for determining angular position, the sensor having a housing, an aperture in the form of two mutually inclined slits, and a linear array of discrete light-sensitive elements producing discrete outputs; wherein the aperture is formed in the housing and is operative simultaneously to develop two laminar light beams in response to light from a small light source, the linear array of light-sensitive elements is contained within the housing, is spaced from said mutually inclined slits, and so orientated that said laminar light beams developed by the aperture impinge on the array at positions dependent on the angular position of the light source with respect to the sensor in two orthogonal axes.

3. A sensor according to claim 2, wherein said mutually inclined slits are rectilinear, lie in common plane, and are intersected at substantially equal angles in the plane of the slits by a plane containing said linear array.

4. A sensor according to claim 3 wherein said linear array is rectilinear and parallel to the plane of the slits.

5. A sensor according to claim 3 wherein said mutually inclined slits are in a V-shaped configuration.

6. A sensor according to claim 3 wherein said slits are mutually inclined at an angle of substantially 53°.

7. A sensor according to claim 3 wherein said light sensitive elements are charge-coupled devices.

* * * * *